United States Patent [19]

Binder et al.

[11] Patent Number: 5,178,973
[45] Date of Patent: Jan. 12, 1993

[54] BATTERY HAVING IMPROVED EXPLOSION ATTENUATION MATERIAL

[75] Inventors: Richard R. W. Binder, Menomonee Falls; Christopher J. Hansen, Milwaukee, both of Wis.

[73] Assignee: Globe-Union, Inc., Milwaukee, Wis.

[21] Appl. No.: 658,308

[22] Filed: Feb. 20, 1991

[51] Int. Cl.$^5$ .................... H01M 2/12; H01M 2/38
[52] U.S. Cl. .................................. 429/53; 429/57; 429/86; 429/81
[58] Field of Search ............... 429/53, 57, 86–89, 429/58, 67, 72, 81, 225; 428/920, 303, 304.4, 332

[56] References Cited

U.S. PATENT DOCUMENTS

| | | |
|---|---|---|
| 2,341,382 | 2/1944 | Jensen . |
| 3,650,431 | 3/1972 | Stewart . |
| 4,141,460 | 2/1979 | Stanistreet et al. . |
| 4,154,357 | 5/1979 | Sheard et al. . |
| 4,751,154 | 6/1988 | Binder et al. . |
| 4,751,155 | 6/1988 | Binder et al. ............... 429/53 |
| 4,859,546 | 8/1989 | Binder et al. . |
| 4,963,444 | 10/1990 | Delaney ........................ 429/67 |

Primary Examiner—Anthony Skapars
Attorney, Agent, or Firm—Foley & Lardner

[57] ABSTRACT

A fibrous material is inserted into the head space above the cells in a storage battery to attenuate the explosion of combustible gases accumulating therein. The attenuation material preferably includes a proportion of fine fibers effective for attenuation and a proportion of heavier fibers effective for electrolyte management.

15 Claims, 2 Drawing Sheets

BATTERY HAVING IMPROVED EXPLOSION ATTENUATION MATERIAL

TECHNICAL FIELD

The present invention relates to electric storage batteries or cells and, in particular, to an improved material and method for attenuating an explosion of combustible gases which accumulate in the head space of electric storage batteries.

BACKGROUND OF THE INVENTION

Many batteries generate combustible gases during operation. These gases are either vented from the battery container into the atmosphere or recombined within the battery in secondary reactions with the active materials. However, even in batteries which provide for internal recombination of combustible gases, there are certain circumstances, such as inadvertent or abusive overcharge, in which the recombination mechanism is ineffective and significant volumes of combustible gases are generated.

Combustible gases within the head space of a battery may be accidentally ignited and result in an explosion. The damage and injury resulting from such explosions are well documented. Thus, for many years, effective and reliable means have been sought for preventing or minimizing explosions in batteries and the hazardous effects thereof.

Combustible gases which are generated within a battery, if not effectively recombined, will eventually create a high internal pressure. To alleviate this pressure, these gases must be vented to the atmosphere. Venting is typically accomplished through the use of a simple open vent slot or a one-way relief valve, sometimes referred to as a "burp" valve. During venting of combustible gases, an external source of ignition, such as a flame or spark near the battery vent, can result in an ignition which will propagate back into the battery container and result in an explosion. Improvements in relief valve construction and the development of flame arrestors used in conjunction with vents, have considerably decreased the incidence of battery explosions caused by external ignition sources, provided that such protective devices have not been removed or disabled, or that the integrity of the container or cover has not otherwise been breached.

However, should an external source of ignition breach one of the protective devices, or should an ignition occur within the container, the combustible gases in the head space may explode. The concentration of gases, typically a mixture of hydrogen and oxygen in a typical lead-acid battery, and the relatively large volume of the head space can result in an explosion which will shatter the container, cover or other components. In addition, the explosion will also often carry with it the liquid acid or other hazardous electrolyte from within the container.

Thus, materials and methods for suppressing or minimizing the effects of explosions within batteries have been long sought. Elimination of the open head space, or substantially filling it with a solid material, would virtually eliminate the possibility of an explosion simply because the presence of combustible gases would be eliminated. However, neither alternative is acceptable. An open head space is necessary in virtually all secondary storage batteries. The head space accommodates certain essential battery components, such as plate straps, intercell connectors, or terminals. In addition, in batteries which utilize free liquid electrolyte, sometimes referred to as "flooded" systems, open head space is necessary to accommodate variations in the level of the electrolyte as the battery is cycled, or to provide space for acid movement under extreme conditions of use, such as abusive overcharge. The head space also accommodates movement of the electrolyte level as the battery is tilted in service, such as the ability to operate an automobile on an incline without loss of electrolyte. Thus, due to the need to accommodate certain structural components of the battery and to provide space for electrolyte level fluctuations, the head space in batteries must be maintained.

For many years, it has been known to fill the head space in a battery or cell, either partially or totally, with a porous material to inhibit the explosion of gases within the head space and quench any flame which may be formed, while still allowing the movement of gases and electrolyte through the material. For example, Jensen U.S. Pat. No. 2,341,382 issued February, 1944, discloses partially filling the head space with a loosely packed material, such as crushed stone or glass, diatomaceous earth, or glass wool.

There are a number of factors which are believed to have generally inhibited the practical application of explosion attenuation technology in batteries. These include the creation of other hazards, and detrimental effects on battery performance. As the head space of a battery is filled with a porous material, there will be a decrease in the remaining void volume in the head space inversely proportional to effective void volume of the filler material. In other words, the more solids present in the filler material, the greater will be the reduction in the total head space volume. Particularly in flooded batteries, the loss of actual open head space volume will lessen the space available for electrolyte movement or electrolyte level variations.

It is known that high rate charging or excessive overcharging can result in vigorous gassing in many types of batteries, particularly lead-acid batteries. If the gas bubbles formed in the electrolyte cannot find fairly direct channels to the battery vent openings, electrolyte may be upwardly displaced and overflow through the battery vents. This condition is known as electrolyte pumping or spewing. The damaging and hazardous effects of a corrosive electrolyte flowing out of a battery are obvious.

Electrolyte pumping can also occur even where the head space of the battery is filled with a very highly porous material, i.e., a material having a high void volume. For example, an open cell foam material may have a void volume as high as 97 to 98% and, if placed in the the total volume thereof. Nevertheless, in a flooded battery, such a material may readily retain electrolyte and not allow it to drain back into the battery by gravity. Electrolyte so retained in a porous filler material will be readily pumped from the battery under the conditions of vigorous gassing, described above.

Further, if a relatively large volume of electrolyte is drawn from the cells through wicking by a porous material in the head space, or if the porous material otherwise retains the electrolyte with which it comes into contact, insufficient electrolyte may remain in the cells for proper electrochemical reaction and operation of the battery.

Any material to be used as an attenuation material in batteries must possess certain other physical properties. Such a material must have adequate resilience to retain its shape and to readily fill the sometimes irregular shape of the battery head space. The material must also be thermally and chemically stable in the operating environment within the battery. To provide adequate safety, any attenuation material must be able to survive repeated ignitions without melting or sintering. A material capable of effectively operating only once, which is destroyed in the process would not be satisfactory. Additionally, the material cannot, of course, dissolve in or otherwise react with the liquid electrolyte.

A number of porous plastic materials have been used in fuel tanks or similar containers as a means for reducing explosion hazards. Both fibrous and cellular plastics of various kinds are disclosed in the art. Allen U.S. Pat. No. 3,561,639 issued February, 1971, discloses a single block of open cell polyurethane foam to fill the interior of a fuel tank. The disclosed material has a reticulated (fully open) pore structure, a pore size ranging from 10 to 100 pores per linear inch (ppi), and a void volume of 97%. The fully reticulated structure is described as important to keep flame propagation from reaching the velocity necessary for explosion and to provide a high degree of permeability for the liquid fuel.

Bulked fibrous plastic materials of many types have also been proposed for use as a means of arresting flames and reducing explosion hazards in fuel tanks. The filamentary plastic materials proposed for such use include polyolefins, nylon, dacron, polyesters, acrylics, and polyurethanes, and others. The materials are typically bulked or textured to provide high porosity and void volume by any of many well-known methods such as twisting, looping, crimping, needle punching and so forth. Examples of various types of such materials are described in Stewart U.S. Pat. No. 3,650,431 issued March, 1972, Stanistreet, et al. U.S. Pat. No. 4,141,460 issued February, 1979, and Sheard et al. U.S. Pat. No. 4,154,357 issued May, 1979.

The use of the foregoing porous plastic materials to suppress explosions in fuel tanks, however, does not suggest use of these materials in storage batteries. More particularly, the use of these materials as an explosion attenuation material in the open head space of such batteries is not suggested.

Other patents owned by a common assignee address this problem by providing an explosion attenuating material comprising closely packed pillows made of a foam or a fibrous material such as polypropylene. See Binder et al. U.S. Pat. No. 4,751,154, issued Jun. 14, 1988, and 4,859,546, issued Aug. 22, 1989. The subject matter of these patents is hereby incorporated herein by reference.

In the explosion attenuating materials disclosed in the foregoing patents to Binder et al., certain materials which attenuate explosions and quench the flames resulting from the ignition of combustible gases do not perform well in other aspects of battery operation. The violence of an explosion (in terms of the peak pressure developed within the open head space of a battery) can be reduced by substantially filling the head space with certain types of porous materials. The pressure developed during an explosion is, up to a point, reduced as the pore size of the attenuation material is decreased. Unfortunately, as the pore size of the material decreases, the adverse effects of the material on battery performance increase. The smaller the pore size of the material, the greater the propensity of the material to wick up electrolyte, i.e., to retain within the pores electrolyte with which it is wetted.

Absorbed electrolyte cannot drain back into the cell and can result in two serious problems. First, electrolyte retained in the porous material reduces the level of electrolyte covering the plates, potentially shortening battery life and diminishing electrical performance of the battery. Second, retained electrolyte will inhibit the flow of gases generated within the battery and, in certain circumstances of operation, result in electrolyte being pumped out of the battery through the vent openings. The present invention addresses these problems.

SUMMARY OF THE INVENTION

An improved explosion attenuating material according to the invention contains an amount of absorbed electrolyte sufficient to hinder deterioration of the material but insufficient to cause pumping of the electrolyte out of the battery. In a preferred embodiment, the novel explosion attenuating material is formed of sulfuric-acid resistant fibers of two different types, one having a greater fineness than the other. One type of fiber allows drainage of the electrolyte, whereas the other limits pressure build-up and thus provides more effective attenuation.

BRIEF DESCRIPTION OF THE DRAWINGS

The invention will be further described with reference to the accompanying drawings, wherein like numerals denote like elements, and.

DETAILED DESCRIPTION OF PREFERRED EMBODIMENTS

Figure 2:
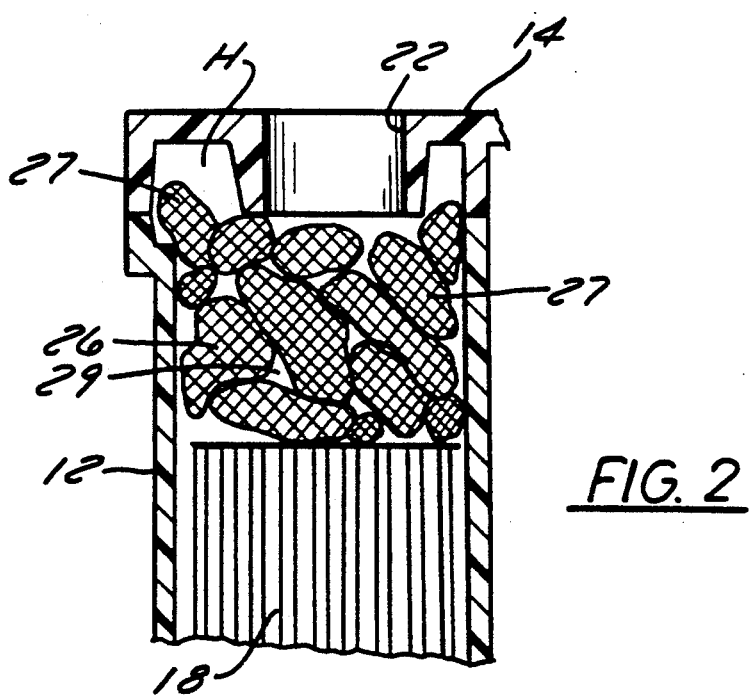
FIG. 2 is an enlarged sectional view taken on line 2—2 of FIG. 1.
Figure 3:
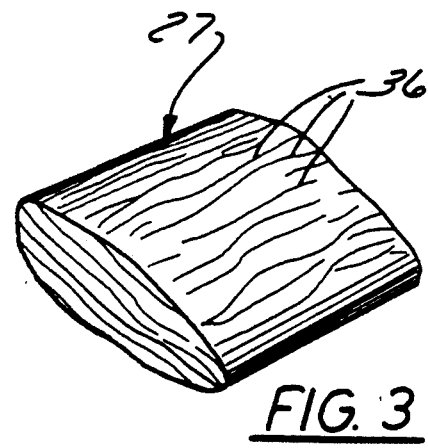
FIG. 3 is a perspective view of a fiber pillow according to the invention.

According to one aspect of the invention, which has been found to be particularly suitable for use in lead-acid and secondary alkaline systems, the attenuating material of the invention may have a bimodal pore distribution as described in U.S. Pat. No. 4,859,546, issued Aug. 22, 1989 to Binder et al. The material is formed into small pillows which fill the head space in each battery cell. The material in each of the pillows provides the microporous structure effective in the attenuation of explosions, and the random orientation of the numerous small pillows used to fill the head space results in a macroporous structure effective for gas and electrolyte movement. An example of such a battery is shown in FIGS. 1-3.

Figure 1:
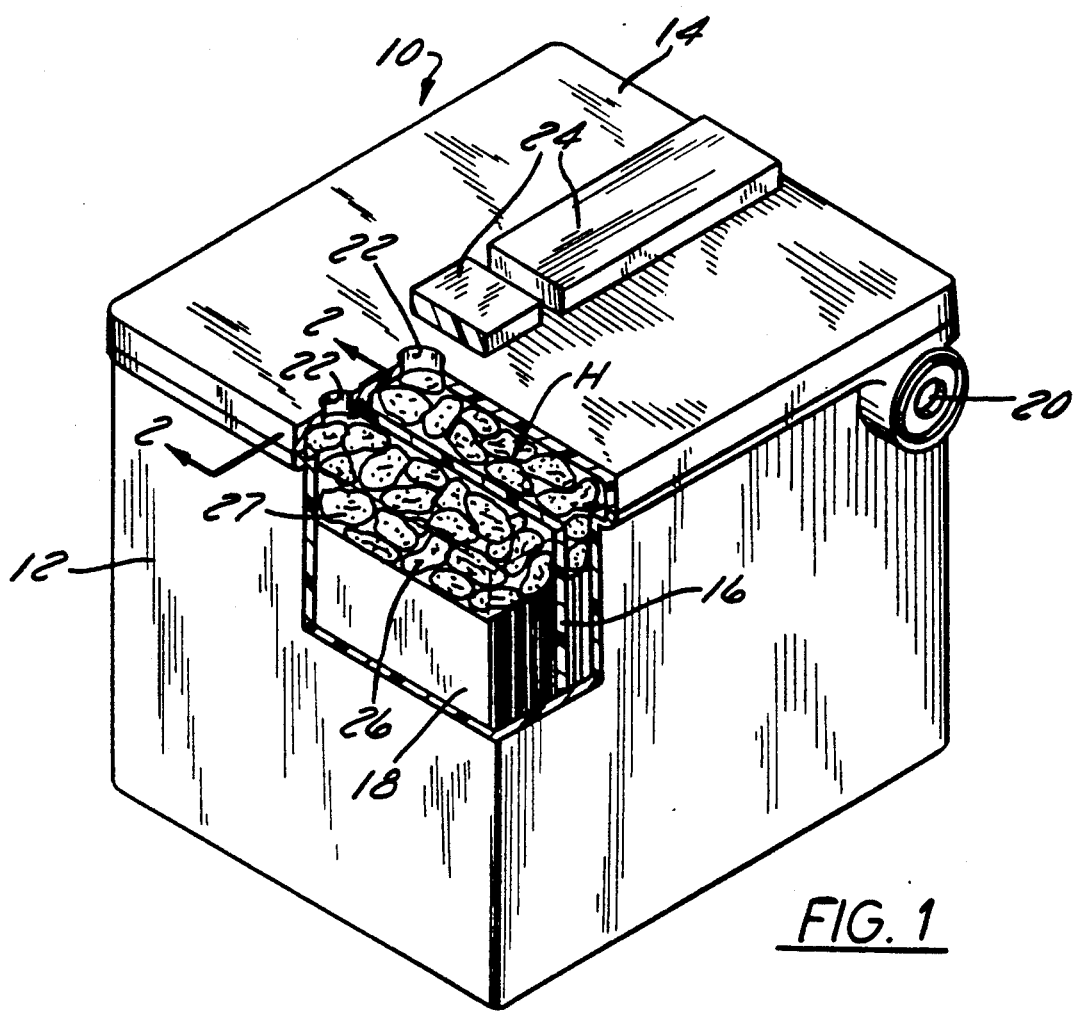
FIG. 1 is a perspective view of a storage battery with portions of the cover and container broken away to show a typical loading of the attenuation material of the present invention in the head space of the battery cells.

Referring to FIG. 1, a storage battery 10 includes a container 12 and cover 14. Container 12 and cover 14 are typically made of thin, injection molded polypropylene. Container 12 is divided into a series of cells by integrally molded intercell partitions 16. Each cell contains an electrode element 18 constructed of a stack of alternating positive and negative plates spaced apart by separators, all in a manner well known in the art. The electrode elements 18 within each cell also include conventional lug and strap connectors (not shown.) Adjacent electrodes are series connected through the cell partition 16 with appropriate conductive intercell connectors (also not shown) well known in the art. The end cells of the battery 10 include connections to exterior terminals 20 through the container wall, as shown, or through the cover 14 in the case of top terminals.

The cover 14 includes a series of vent/fill holes 22, one for each cell. The vent/fill holes 22 are closed with vent cap assemblies 24 which may be fixed or removable. The vent cap assemblies 24 typically include downward depending vent plugs (not shown) which substantially seal the holes 22, but are provided with small holes or passages to allow gases generated within the cell to vent to the atmosphere. The vent assembly 24 also typically includes a microporous flame arrestor adjacent each hole 22 through which gases may vent, but which tends to prevent an external flame or ignition source from propagating back into the cell of the battery.

In the assembly of a typical lead-acid battery of the foregoing construction, the assembled electrode elements 18 are placed in the cells of the battery, the intercell connections between adjacent electrode elements are made through the partitions 16 and, depending on the type, the terminal connections may also be made. Cover 14 is then sealed to the container 12. Each of the cells is filled with a sulfuric acid electrolyte to a level slightly above the tops of the electrode elements 18. The battery is then formed by electrochemically converting lead oxide material in the positive and negative plates to lead dioxide and lead, respectively.

Except for the space occupied by the plate straps, intercell connectors and terminal assemblies, previously mentioned, the space within each cell above the top of electrode elements 18 and below the underside of cover 14 is open. This open head space, designated generally by the letter H in FIGS. 1 and 2, is substantially filled by an attenuation material 26. In an exemplary battery 10 in accordance with this preferred embodiment, the open head space in one cell is approximately 1.5 by 1.5 by 6.5 inches, or approximately 14.6 cubic inches. With this size head space, a loading of 15 grams of material per each such cell, or approximately 1 gram per cubic inch, provides consistent pressure attenuation on repetitive ignitions. However, other head space volumes may require other packing densities.

The hydrogen and oxygen gases which are generated as a result of the electrochemical reactions within the cell pass upwardly through the electrolyte, between the plates and separators of the electrode element 18 and accumulate in the head space H, until a sufficient positive pressure is established to cause the gases to vent through the vent holes 22, past the flame arrestors or other venting construction in the vent caps 24. The gas mixture is, of course, highly explosive, and an ignition of such gases accumulating in the open head space will result in an explosion which can easily shatter container 12 and cover 14, as well as other elements connected thereto. In addition to destroying the battery, the potential personal danger from exploding battery pieces and acid electrolyte is well known.

Figure 4:
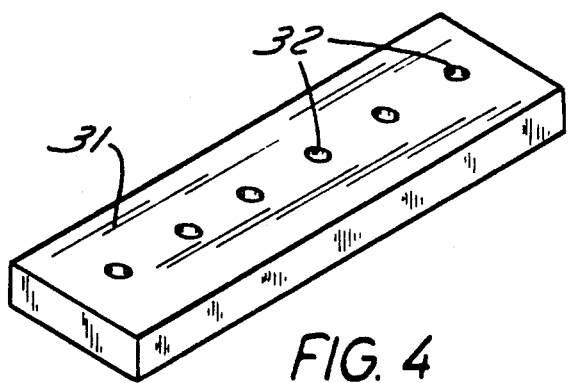
FIG. 4 is a perspective view of a strip of attenuating material according to the invention.

Attenuation material 26 according to the invention comprises one or more batts of material which substantially fill the head space of the battery within each cell. Each batt 26 comprises a number of pillows 27 packed into head space H (FIGS. 1-3). In the alternative embodiment shown in FIG. 4, the attenuation material according to the invention may also comprise a simple strip 31 configured to fit within the head space H in each cell, optionally with a series of spaced holes 32 extending therethrough to facilitate gas and electrolyte movement.

Attenuation material 26 according to the invention should be chemically and physically stable under conditions typically encountered during battery use, i.e., at temperatures ranging from −30° to 80° C. with exposure to electrolyte, and retain its structural integrity even after repeated ignitions within the battery head space. Attenuation material 26 should also be sulfuric-acid resistant if intended for use in a lead-acid battery, and resilient enough to return to its original shape after compressive distortion. In particular, it should be capable of attenuating explosions and quenching a propagating flame front in a dry atmosphere without burning or sintering, and have adequate chemical stability against dissolution or other degradation within the cells.

For these purposes, attenuation material 26 preferably comprises an open-celled foam or lofted fibers made of polyalkylenes, particularly polypropylene and cross-linked polyethylene, or fiberglass. Needle-punched polypropylene fibers (washed if needed to remove lubricant), melt-blown polypropylene fibers, and polypropylene foams are most preferred. Fibrous polypropylene is particularly well suited for use in a wide variety of flooded secondary systems, both acid and alkaline. Polypropylene is stable and essentially insoluble in aqueous sulfuric acid solutions used in lead-acid batteries. In flooded alkaline systems, typically utilizing an aqueous potassium hydroxide electrolyte, polypropylene will not dissolve or degrade in the alkaline electrolyte or sinter or melt in the presence of a flame. Thus, although a variety of cellular and fibrous plastics are suitable for use as explosion attenuation materials in lead-acid batteries, polypropylene is best suited for use in acid and alkaline systems, considering effectiveness, cost and stability.

Referring to FIGS. 2 and 3, attenuation material 26 comprises closely packed, separate pieces (pillows) 27 made of elongated fibers 36. The spaces 29 between pillows 27 allow the generated gases to pass relatively uninhibited from the electrode elements 18, through the attenuation material 26, and out the vent openings 22. Pillows 27 are packed into head space H in an amount effective to limit pressure build up resulting from ignition of gasses within the container 12, but insufficient to cause pumping of the electrolyte out of container 12.

It has been discovered in accordance with the present invention that the amount of electrolyte retained in the explosion attenuating material has an important effect on its performance. If little or no electrolyte is retained, the material 26 will not be able to resist repeated ignitions. Absorbed or adsorbed electrolyte heats up and/or vaporizes during an explosion within the head space, absorbing energy of the explosion which might otherwise sinter or destroy (melt) the plastic fibers of the attenuation material 26, reducing or destroying its effectiveness.

If too much electrolyte is retained, the performance of the battery is affected because electrolyte which should be down around the electrode elements 18 is instead absorbed into material 26. If extra electrolyte is added to compensate for this, electrolyte pumping as described above occurs when gases are generated within the battery. To avoid these problems, attenuation material 26 preferably absorbs from about 0.1 to about 5 ml, most preferably 1-4 ml, of electrolyte per gram of fibers. When the amount of absorbed electrolyte is within the latter range, the attenuating material can survive 20 or more ignitions. In a dry state, i.e., with less than about 0.1 ml/g of the vaporizable liquid electrolyte, the attenuating material can survive only 1-2 ignitions.

The fineness of the fibers of the attenuation material affects the amount of electrolyte it will retain. In particular, material 26 is preferably made of a blend of first, fine fibers and second, coarse (heavy) fibers. The first fibers preferably have a fineness in the range of about 5 to about 40 denier, whereas the second fibers have a fineness in the range of about 30 to about 120 denier. Since these ranges overlap, the invention in its broad aspect contemplates that material 26 could be made of fibers having a uniform fineness in the range of about 30-40 denier. However, a blend of heavy and light fibers, as opposed to a uniform batt of medium weight fibers, provides remarkably better performance. Thus, the second fibers preferably have a denier size greater than that of the fine fibers. In a preferred embodiment, the fine fibers have a fineness of at least twice, especially at least three times the fineness of the heavy fibers. Denier combinations of 15/30, 20/40, 25/50, 15/60, 20/80 are representative. Preferred fiber size subranges are 10-30 denier, especially 10-20 denier for the fine fibers, and 30-100 denier, especially 40-80 denier for the heavy fibers.

The heavy and fine fibers are preferably interspersed substantially uniformly among each other to form each pillow 27. The fine fibers limit pressure build-up within head space H caused by the ignition of gases within container 12. The heavy fibers allow drainage of the electrolyte from the batts so as to prevent pumping of the electrolyte from container 12 and/or excessive absorption of electrolyte. Gas movement in the head space may be inhibited by excessive liquid electrolyte retained in the attenuation material 26, effectively blocking the paths available for gas movement. The heavy fibers 28 prevent this by allowing the acid to drain back readily into the cell.

The attenuating material generally comprises 10-90 wt. % of the heavy fibers and 10-90 wt. % of the fine fibers. Outside of these ranges, the resulting blend fails to have one or more of the desired properties as described above. A roughly equal mixture, i.e., 40-60 wt. % of heavy fibers and 40-60 wt. % of light fibers, is most preferred. The density of the attentuating material is generally within the range of particularly 10-20 oz./yd$^2$ for a uniform thickness of about 0.5-0.6 inch.

The distribution of heavy and fine fibers should be sufficiently uniform throughout attenuation material 26 to ensure that there are a sufficient number of open, interconnected channels within each pillow 27 for drainage of the electrolyte. On the other hand, it is desirable to keep the amount of heavy fibers 28 at a minimum since they are less effective than the fine fibers 30 in attentuating explosions. However, variations may be made in the components of the attenuation material 26 while still providing effective attenuation and electrolyte/gas management.

Maintaining the attenuation material 26 under compression within the head space, preferably from 5 to 20 volume percent, and substantially complete filling of the head space H allow optimum performance. Maintaining the material under compression provides two benefits. First, the inherent resilience of the material will cause it to fill the entire open volume of the head space before it has reached its free, fully expanded state. This helps assure there will be no significant open volumes within the head space which would allow an explosion or pressure build-up of more than minor and insignificant proportions to occur. Second, it has been found that the materials described herein maintained in compression attenuate explosions better (result in lower peak pressures) than the same materials in a free, uncompressed state.

Attenuation material 26 slows the rate of ignition and explosion and eventually acts to quench a flame before complete combustion of the gases can occur. Small, inconsequential explosions, or "pops", can occur in the portions of the head space not completely filled with (i.e., below) the attenuation material 26. The pressure developed by these minor explosions, however, is relatively significant and, if the attenuation material 26 is properly prepared and installed, such explosions have been found to cause no substantial damage to the battery container, cover, or the internal battery structure.

Figure 5:
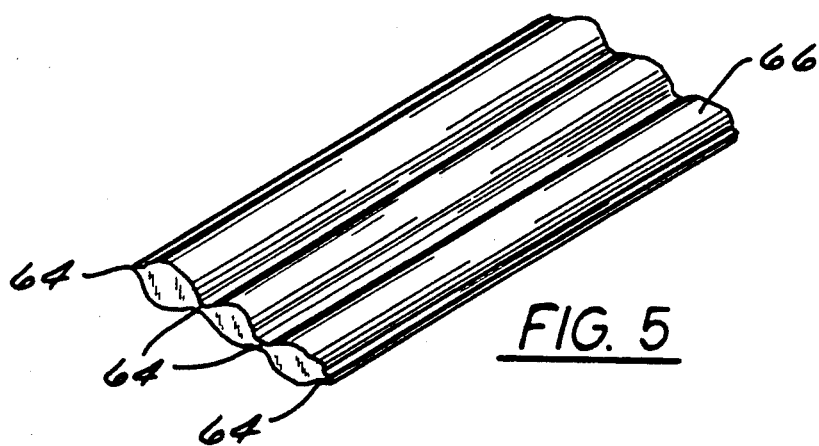
FIG. 5 is a perspective view of a mat of polypropylene fibers after crimping.
Figure 6:
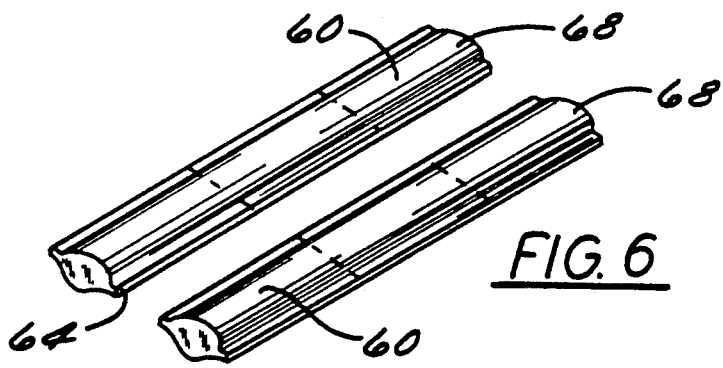
FIG. 6 is a perspective view of a crimped polypropylene fiber strips made from the mat of FIG. 5.
Figure 7:
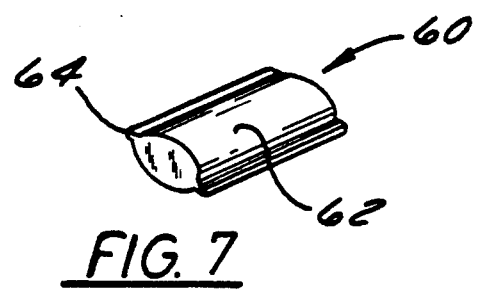
FIG. 7 is a perspective view of a crimped polypropylene fiber pillow according to the invention made from the strips of FIG. 6.

Referring to FIGS. 5 to 7, in an alternative embodiment of the invention, pillows 60 made of lofted polypropylene have a bulked segment 62 and at least one bonded segment 64. A mat of needle punched polypropylene is ultrasonically bonded at preselected spaced intervals to form a series of bonded segments 64. The bonded segments are approximately ⅛ inch wide. The mat is cut along the bonded segments 64 to form insert strips 68, as shown in FIG. 6. Strips 68 are than cut transversely to form pillows 60. Strips 68 may also be formed by making lengthwise cuts with a hot knife that fuses the edges to form segments 64, eliminating the ultrasonic bonding step. A preferred pillow 60 is 1 by 1 inch square with a thickness of about 0.5 inch and two bonded side edge segments 64, as shown.

The bonded segments 64 help to create a loose packing. If desired, pillows 60 may be randomly and loosely loaded into a containing netting to form an attenuating assembly. The netting is a substantially open mesh preferably made of polypropylene or other plastic material which is not soluble in the electrolyte. Pillows 60 (or 27) are loaded into space H above each cell of the battery, and the cover 14 is then sealed in place.

Attenuation materials as described herein are effective in preventing the evaluation of electrolyte mist from the battery vents 22 when vigorous gassing occurs. This phenomenon is sometimes referred to as electrolyte "spewing" and is simply the upward and outward movement of atomized electrolyte created by the breaking of gas bubbles. Spewing can occur, for example, during initial formation or on overcharge. Electrolyte spewing is minimized or eliminated because the fibrous materials filter the atomized mist from the evolving gases. In some flooded systems which are known to gas particularly vigorously, such as alkaline nickel-iron cells, the attenuation material will also filter active material oxides which are spewed from the electrodes, as well as the electrolyte mist. Spewing, of course, is detrimental from the standpoint of electrolyte loss, as well as the corrosive and other hazardous effects of its venting to the atmosphere.

The attenuation materials 26 disclosed herein have been described for use in batteries having flooded electrolyte systems. However, there are a variety of secondary storage batteries which operate with an immobilized gelled electrolyte or with a so-called "starved" electrolyte system. In either of these non-flooded systems, the intent is to eliminate free liquid electrolyte within the cells such that the battery can be operated in any attitude without electrolyte loss.

Certain starved electrolyte systems also are constructed to operate on the principle of oxygen recombination such that, during normal operation, evolved oxygen is recombined within the active material of the electrodes and does not accumulate within the battery or have to be vented to the atmosphere. Typically, such batteries are also made with an excess of negative active material in an attempt to prevent the generation of hydrogen gas.

In gelled or starved electrolyte systems, although an open head space is not ordinarily required for the gas-/electrolyte management needed in flooded systems, an open head space is still required to accommodate the cell elements which are similar in batteries of all kinds. Also, notwithstanding the intent in starved or gelled systems to eliminate or reduce the generation of potentially explosive gases, such gases are occasionally evolved in these systems and accumulate, prior to venting, in the open head space. Thus, during formation of these batteries or during unusual circumstances of use, such as inadvertent or abusive overcharge, both hydrogen and oxygen gas may be evolved. Indeed, batteries which utilize a gelled acid electrolyte, oxygen recombination is typically slower than in true recombination systems and hydrogen is also more readily generated even under open circuit conditions. Thus, there is direct applicability of the explosion attenuation device described herein in non-flooded systems as well.

A series of samples of needle punched polypropylene were tested for acid retention. In each case a sample weighing from 5 to 9 grams was immersed in a 1.265 specific gravity aqueous sulfuric acid solution. The amount of acid entering the sample was determined. The acid was then allowed to drain from the sample until no further flow of acid was noted, and the sample was then weighed to determine how much electrolyte remained absorbed. The results were as follows:

| Sample | Acid Retention Denier | Oz./yd2 | Acid (ml/g) |
|---|---|---|---|
| 1-Invention | 15/60 | 12.9 | 1.6 |
| 2-Invention | 15/60 | 11.9 | 1.7 |
| 3-Invention | 15/60 | 15.3 | 2.1 |
| 4-Invention | 15/60 | 19.6 | 2.2 |
| 5-Invention | 30 | | 4.9 |
| 6-Comparison | 15 | 19.0 | 5.4 |

The materials of Samples 1–4 were made of a 50/50 by weight mixture of Tex Tech 5534 NPP fibers. Sample 5 was made of Phillips PP. Sample 6 was 100% 15 denier NPP fibers (Tex Tech XT74). It was found that washing this material with hot soapy water (microsoap) reduced its acid retention significantly, e.g. to 2.7–3.7 ml/g. However, the Sample 6 material also had marginal attenuation performance (see below).

Tests for chemical and physical stability and attenuation performance were also conducted. Materials such as polyester and PET fibers degraded when exposed to simulated electrolyte (5 hours reflux in a hot aqueous sulfuric acid/acid dichromate solution to simulate an oxidizing battery environment.) Coarse materials such as 130-denier NPP and coarse or medium grade polyethylene sintered when subjected to repeated explosions within a conventional lead-acid battery. The 15 denier material of Sample 6 above also sintered to some extent.

A 50/50 mixture of 15/130 denier NPP had acceptable acid retention but lacked physical stability and sintered, indicating the importance of not using excessively coarse polypropylene. Fiberglass materials tested were satisfactory in chemical stability, acid retention and attenuation, but marginal in physical stability. Similarly, polyurethane foam materials performed well but had poor long term chemical stability. Thus, of the materials tested, it was determined that a mixture of fine and moderately fine NPP fibers provided optimum properties for performance as an explosion attenuating material according to the invention.

The attenuation materials according to the invention can also be used in a battery provided with a hydrostatic electrolyte pump as set forth in commonly assigned U.S. patent application Ser. No. 07/358,688, filed May 30, 1988, now U.S. Pat. No. 4,963,444 the entire contents of which are incorporated herein by reference. Pillows of NPP 50%/50% 15/60 denier were inserted into the head space of a battery having the structure shown in FIG. 7B of the foregoing U.S. patent application Ser. No. 358,688, and it was found, surprisingly, that the hydrostatic pump was still functional, although reduced in effectiveness.

While several embodiments in the present invention have been described in the foregoing specification, such descriptions and the drawings are for purposes of illustration and the invention is to be limited solely by the scope of the claims which are appended hereto.

We claim:

1. A lead-acid electric storage battery, comprising:
a container;
a plurality of electrode elements disposed within said container;
a sulfuric acid electrolyte in contact with said electrode elements within said container;
a vent in communication with said head space for venting gases generated by electrochemical reactions within said battery; and
a porous explosion attenuating material disposed within a head space of said container over said electrode elements, which explosion attenuating material is effective to limit pressure build-up resulting from ignition of said gases within said container and effective to allow movement of said gases and electrolyte within said head space during operation of said battery, wherein said material contains about 0.1 to 5 ml of said electrolyte per gram of said material, and wherein the explosion attenuating material consists essentially of about 10 to 90 wt. % of first polypropylene fibers having a fineness in the range of about 5 to 30 denier, which first fibers are effective to limit said pressure build-up, and 90 to 10 wt. % of second polypropylene fibers having a fineness in the range of about 30 to 100 denier, the second fibers having a denier size at least twice the denier size of the first fibers, which second fibers are interspersed substantially uniformly among the first fibers and are effective to allow drainage of said electrolyte from the explosion attentuating material.

2. The battery of claim 1, wherein said attenuating material comprises a batt of fibers.

3. The battery of claim 1, wherein said fibers contain from 0.5 to 5 ml of said electrolyte per gram of said fibers.

4. The battery of claim 1, wherein said fibers contain from 1 to 4 ml of said electrolyte per gram of said fibers.

5. The battery of claim 1, wherein said explosion attenuating material consists essentially of 40-60 wt. % of said first fibers, which first fibers have a fineness in the range of about 10 to 20 denier, and 60-40 wt. % of said second fibers, which second fibers have a fineness in the range of about 40 to 80 denier.

6. A pressure attenuating material for insertion into a substantially closed electric storage battery comprising a plurality of bulked, fibrous pillows, each pillow consisting essentially of from about 10 to about 90 wt. % of first polypropylene fibers, having a fineness of about 10 to about 30 denier, interspersed among about 90 to about 10 wt. % of second polypropylene fibers having a fineness of about 40 to about 80 denier, the second fibers having a denier size at least twice the denier size of the first fibers.

7. The material of claim 6, wherein each of said pillows has a central, bulked segment and a side, crimped segment.

8. A lead-acid battery comprising:
a substantially closed container having a head space;
a plurality of lead electrode elements disposed within said container below the head space;
a sulfuric acid electrolyte in contact with said electrode elements within said container;
a vent from said container in communication with said head space for venting gases generated by electrochemical reactions within said battery;
a porous explosion attentuating material contained within said head space of said container over said electrode elements, which explosion attenuating material substantially fills said head space, is effective to limit pressure build-up resulting from ignition of said gases within said container, and is effective to allow movement of said gases and electrolyte within said head space during operation of said battery; and
a hydrostatic pump opening on said head space which circulates said electrolyte.

9. The battery of claim 1, wherein said container consists essentially of molded plastic and has partitions defining a plurality of battery cells containing said electrode elements, and further includes a molded plastic cover secured thereto, which cover adjoins said head space, wherein the explosion attenuating material is effective to prevent damage to said container and cover during an explosion of combustible gases generated by the battery in the head space.

10. The battery of claim 1, wherein the explosion attenuating material is disposed in the head space under compression.

11. The battery of claim 10, wherein the explosion attenuating material is compressed from about 5 to 20 volume percent.

12. The battery of claim 1, wherein the explosion attenuating material has a density in the range of 10 to 20 oz/yd$^2$ as determined for a uniform thickness of 0.5 to 0.6 inch.

13. The battery of claim 1, wherein said explosion attenuating material comprises a plurality of pillows each made of said first and second fibers.

14. The battery of claim 9, wherein said container and cover consist essentially of molded polypropylene.

15. The battery of claim 1, wherein the explosion attenuating material fills said head space.

* * * * *